(12) United States Patent
Demizu et al.

(10) Patent No.: US 8,150,661 B2
(45) Date of Patent: Apr. 3, 2012

(54) DESIGN SUPPORT SYSTEM, METHOD AND STORAGE MEDIUM FOR A ROUTE DESIGN FOR A DEFORMABLE LINEAR STRUCTURE

(75) Inventors: Kouji Demizu, Kawasaki (JP); Masayuki Kidera, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 461 days.

(21) Appl. No.: 12/490,988

(22) Filed: Jun. 24, 2009

(65) Prior Publication Data
US 2009/0265145 A1    Oct. 22, 2009

Related U.S. Application Data

(63) Continuation of application No. PCT/JP2007/001396, filed on Dec. 13, 2007.

(30) Foreign Application Priority Data

Jan. 10, 2007 (WO) ................ PCT/JP2007/050187

(51) Int. Cl.
    *G06F 17/50* (2006.01)
(52) U.S. Cl. ............... 703/1; 703/7; 716/118; 716/119; 716/126; 361/826; 361/827
(58) Field of Classification Search ............ 703/1, 7; 716/118, 119, 126; 361/826, 827
    See application file for complete search history.

(56) References Cited

U.S. PATENT DOCUMENTS

| | | | |
|---|---|---|---|
| 6,240,541 B1 * | 5/2001 | Yasuda et al. | 716/112 |
| 6,560,763 B1 * | 5/2003 | Sugiyama et al. | 716/113 |
| 6,647,314 B2 * | 11/2003 | Kato et al. | 700/187 |
| 6,842,173 B2 * | 1/2005 | Sakakura et al. | 345/419 |
| 6,961,683 B2 * | 11/2005 | Kodama et al. | 703/2 |
| 6,968,289 B1 | 11/2005 | Tsuchiya et al. | |
| 6,970,755 B2 * | 11/2005 | Sakakura et al. | 700/97 |
| 7,143,385 B2 * | 11/2006 | Itou et al. | 716/131 |
| 7,206,723 B2 * | 4/2007 | Sawai et al. | 703/1 |
| 7,343,574 B2 * | 3/2008 | Sawai | 716/106 |
| 7,383,162 B2 * | 6/2008 | Hashima et al. | 703/2 |
| 7,403,829 B2 * | 7/2008 | Yamane | 700/97 |

(Continued)

FOREIGN PATENT DOCUMENTS

JP      07-078260      3/1995

(Continued)

OTHER PUBLICATIONS

International Search Report for PCT/JP2007/001396, mailed Jan. 15, 2008.

(Continued)

*Primary Examiner* — Kamini S Shah
*Assistant Examiner* — Kibrom Gebresilassie
(74) *Attorney, Agent, or Firm* — Staas & Halsey LLP

(57) ABSTRACT

A design support system generates a passing point through which a deformable linear structure in a virtual space according to the instruction of a user via an input device in the edition process and when generating a passing point of type, based on a component such as part or the like in the virtual space by the edition process, automatically generates and manages passing point information including the passing direction of the passing point to be generated, on the basis of the designated component as the reference. A route through which the linear structure should pass is generated using the passing point information of each passing point.

15 Claims, 17 Drawing Sheets

U.S. PATENT DOCUMENTS

| | | | |
|---|---|---|---|
| 7,418,677 B2 * | 8/2008 | Sawai et al. | 716/136 |
| 7,480,596 B2 * | 1/2009 | Hashima et al. | 703/1 |
| 7,529,638 B2 * | 5/2009 | Sawai et al. | 702/150 |
| 7,587,689 B2 * | 9/2009 | Sawai | 716/100 |
| 7,990,376 B2 * | 8/2011 | Demizu et al. | 345/420 |
| 8,041,544 B2 * | 10/2011 | Demizu et al. | 703/1 |
| 8,055,480 B2 * | 11/2011 | Goebbels et al. | 703/1 |
| 2003/0023947 A1 * | 1/2003 | Sakakura et al. | 716/17 |
| 2004/0019399 A1 * | 1/2004 | Kabasawa | 700/121 |
| 2004/0059448 A1 | 3/2004 | Nono et al. | |
| 2004/0123262 A1 * | 6/2004 | Shirota et al. | 716/14 |
| 2004/0130878 A1 | 7/2004 | Sawai et al. | |
| 2004/0153192 A1 * | 8/2004 | Ikeda et al. | 700/118 |
| 2004/0230403 A1 | 11/2004 | Tsuchiya et al. | |
| 2005/0240383 A1 * | 10/2005 | Hashima et al. | 703/7 |
| 2007/0232120 A1 * | 10/2007 | Shimizu | 439/358 |
| 2008/0015824 A1 * | 1/2008 | Grichnik et al. | 703/1 |
| 2009/0125862 A1 * | 5/2009 | Nishio et al. | 716/15 |
| 2009/0138188 A1 * | 5/2009 | Kores et al. | 701/117 |
| 2009/0276194 A1 * | 11/2009 | Kidera et al. | 703/1 |
| 2010/0305908 A1 * | 12/2010 | Kidera et al. | 703/1 |

FOREIGN PATENT DOCUMENTS

| | | |
|---|---|---|
| JP | 10-021269 | 1/1998 |
| JP | 2001-251741 | 9/2001 |
| JP | 02/48923 A1 | 6/2002 |
| JP | 2004-127925 | 4/2004 |
| JP | 2004-139974 | 5/2004 |
| JP | 2004-172088 | 6/2004 |
| JP | 2005-027428 | 1/2005 |
| JP | 2006-209362 | 8/2006 |
| WO | 2004/104868 A1 | 12/2004 |

OTHER PUBLICATIONS

Japanese Office Action issued Jul. 19, 2011 in corresponding Japanese Patent Application 2008-552964.

* cited by examiner

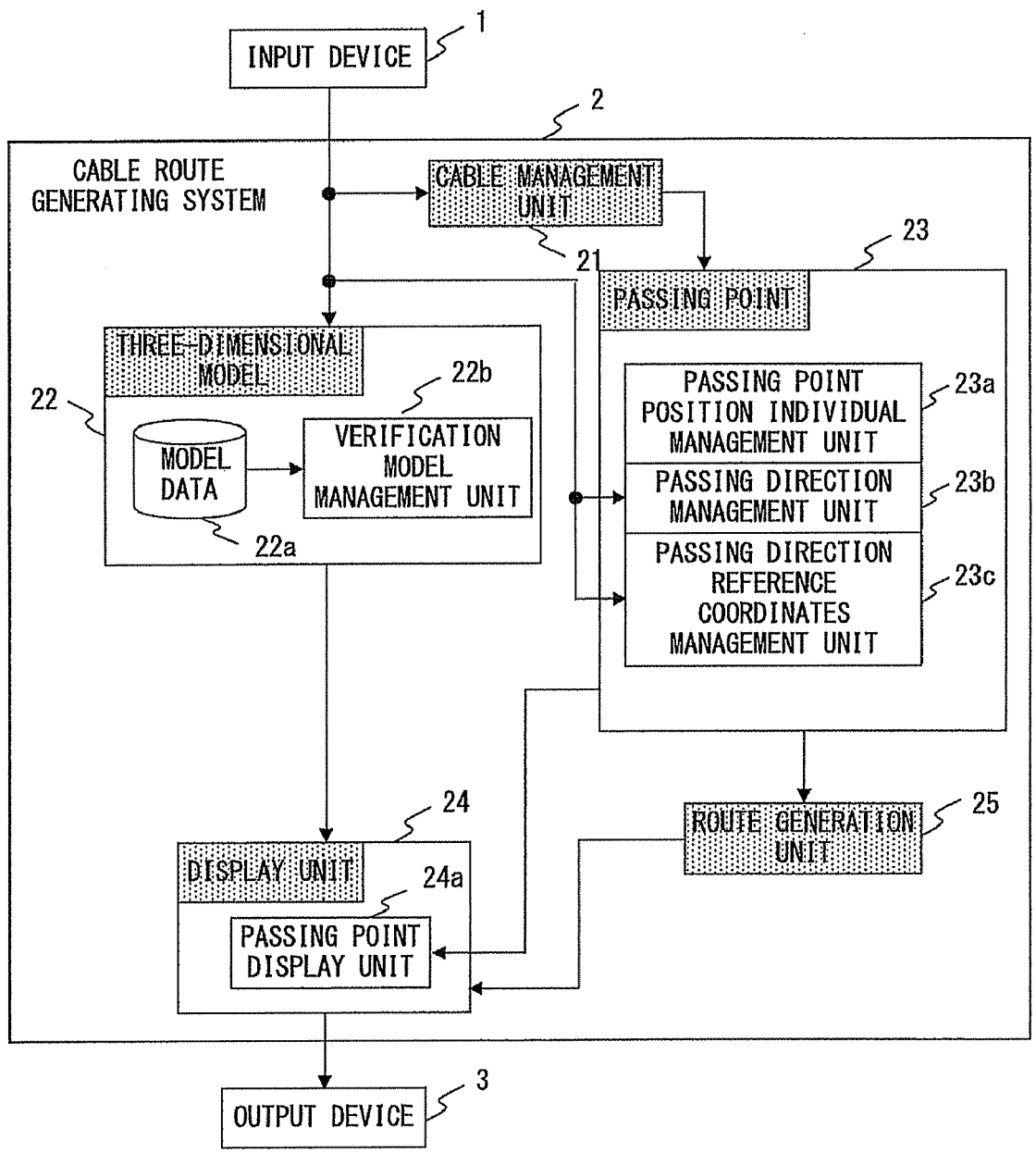
F I G. 1

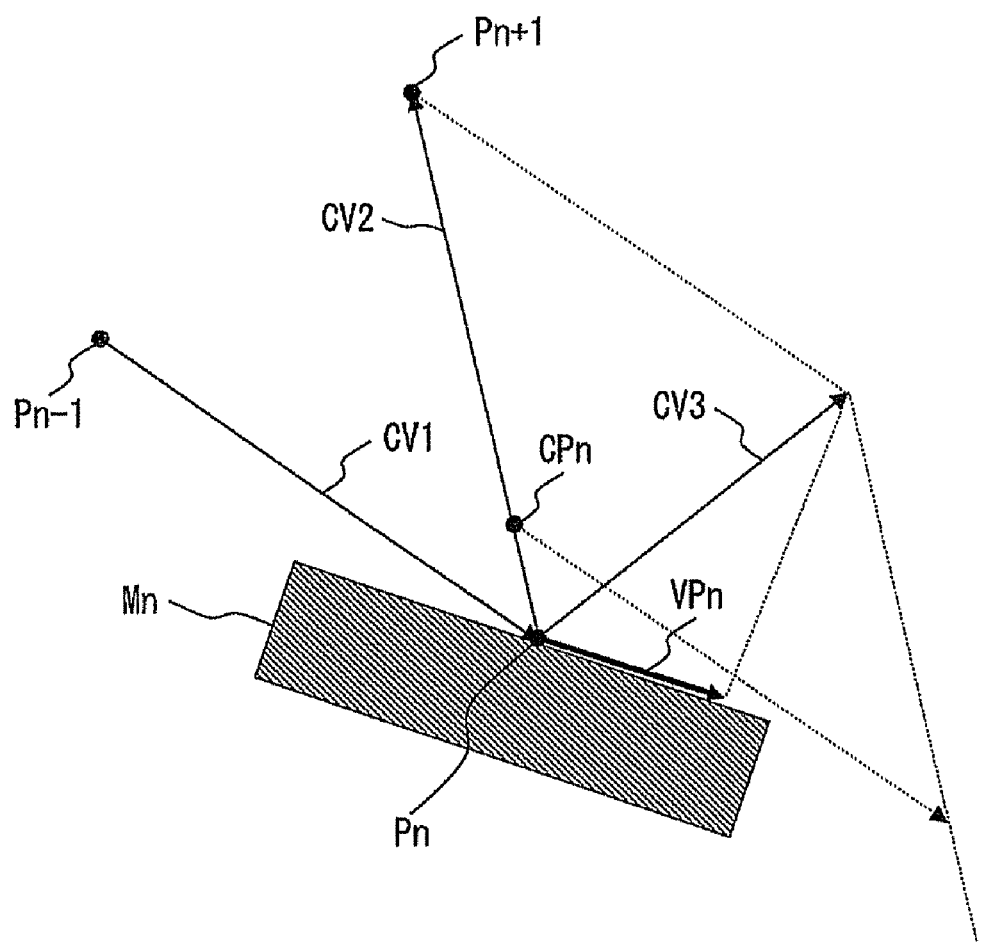
F I G. 4

DESIGN SUPPORT SYSTEM, METHOD AND STORAGE MEDIUM FOR A ROUTE DESIGN FOR A DEFORMABLE LINEAR STRUCTURE

CROSS-REFERENCE TO RELATED APPLICATION

This application is a continuation application of International PCT Application No. PCT/JP2007/001396 which was filed on Dec. 13, 2007, it being further noted that priority benefit is based upon International Patent Application PCT/JP2007/050187, filed Jan. 10, 2007.

FIELD

The embodiments discussed herein are related to a technology for supporting the route design of a deformable linear structure such as wire harness or the like, attached to a device such as an electric appliance, a vehicles, etc. or between a plurality of devices disposed in different places.

BACKGROUND

In some devices for developing products, a cable is used as electric wiring. Wire harness is obtained by processing an electric wire or a cable and is an indispensable component in most of device provided with a plurality of units, a vehicle and the like. Therefore, recently software for supporting route design for arranging a cable (hereinafter called "route design support software") has been sold. Since in manufacturing business, computer-aided design (CAD) is widely introduced, such support software usually designs the route of a cable arranged in a device, in a virtual space, using the design data of the device. A design support system for supporting the route of a cable can be realized by a data processing device (computer) executing the route design support software.

A cable has a fairly high flexibility. However, if the design is promoted without taking into a cable, sometimes the design of a product has to be modified due to the cable. This is because inconveniences that a cable has to be forcibly curved, its fixing workability is bad, it interferes with other components and so on are easy to be missed. In a route design using design data, such inconveniences can be easily avoided.

A route is designed by designating (generating) passing points being positions through which a cable should pass, using the design support system. In the position designation of the passing point, a positional reference being a position which is a base in specifying the position is usually selected as an attribute. For such a positional reference, one based on the origin of the coordinate system of a virtual space (hereinafter called "reference coordinates"), one based on another passing point (hereinafter called "relative coordinates") and one based on a component (model) disposed in a virtual space (hereinafter called "model reference") are used. Since those positional references are referenced in order to specify a passing point, it is hereinafter called "reference destination". The above-described coordinate systems are determined by the target range of the route design and the entire device is usually managed by another coordinate system (hereinafter called "absolute coordinate system").

The route of a cable is determined by calculating a curve passing through passing points. As such a curve, a parametric curve, more particularly a Bezier curve is generally calculated. Therefore, in each passing point, besides the position, the passing direction of a cable is usually managed as passing point information.

In a conventional design support system, the passing direction in a passing point is automatically set on the basis of the positions of passing points before and after the passing point. Therefore, in the passing point of a model reference, sometimes a passing direction toward the inside of a component (model) is set on the basis of the positions passing points before and after it (FIG. 5A).

When a passing direction toward the inside of a component is set, a route determined by a Bezier curve is not actual one since it passes through the inside of the component (FIG. 5B). Therefore, in order to surely determine an appropriate route, it is considered necessary to set a passing direction (passing point information) taking other than other passing points into consideration.

The cable itself is a deformable linear structure. Such a device is not only a linear structure with many fairly thin objects, such as an electric wire, a cable (including wire harness, an optical cable, etc.) or a wire but also a cylindrical linear structure with many fairly thick objects are sometimes attached.

Such a linear structure is sometimes inserted not only between units mounted in one device (product), such as an electrical appliance, a vehicle or the like, but also between a plurality of devices disposed in respective different places. Therefore, a route is sometimes designed in order to insert a linear structure between separate devices. Specifically, the target of route design is not only one device, but also is a plurality of devices disposed in respective different places. Therefore, it is important to easily and appropriately design a route regardless of such a difference in a target.

Patent document 1: Japanese Patent Laid-open Publication No. 2006-209362
Patent document 2: Japanese Patent Laid-open Publication No. H10-21269

SUMMARY

Both design support systems in the first and second aspects of the invention are used to support a route design for attaching a deformable linear structure to a target and include the following respective units.

The design support system in the first aspect includes an edition unit for generating a passing point through which a linear structure should pass in a virtual space according to the instruction of a user via an input device, a passing point management unit for generating and managing passing point information including the passing direction of the passing point, on the basis of the designated component as the reference when generating a passing point of the type, based on a component in the virtual space by the edition unit, and a route generation unit for generating a route through which the linear structure should pass in the virtual space using passing point information managed by the passing point management unit. The route generation unit determines the normal of the plane of a designated component as the passing direction when the passing point is a starting point and generates a route through which the linear structure should pass in the virtual space determining a direction the reversal of the normal of the plane of the designated component as the passing direction when the passing point is an ending point.

The design support system in the second aspect includes an edition unit for generating a passing point through which a linear structure should pass in a virtual space, according to the instruction of a user via an input device, a passing point management unit for setting one of directions defined in a prescribed component as the passing direction of the passing point when generating a passing point for passing the linear structure through the inside of the prescribed component in the virtual space by the edition unit, and a route generation unit for generating a route through which the linear structure should pass in the virtual space, using a passing direction managed by the passing point management. The route generation unit determines the normal of the plane of the prescribed component as the passing direction when the passing point is a starting point and generates a route through which the linear structure should pass in the virtual space determining a direction the reversal of the normal of the plane of the prescribed component as the passing direction when the passing point is an ending point.

A system to which the present invention is applied generates (defines) and manages passing point information including the passing direction of the passing point, on the basis of a designated component as the reference when generating a passing point of type, based on a component such as part, device or the like, in a virtual space as the passing point through which the linear structure should pass in the virtual space. By taking the component into consideration, an appropriate passing direction can be more surely set.

Therefore, the appropriate route of the linear structure can be more surely determined. Since the passing direction can be automatically set, the operability of a user can be improved and a route can be more easily designed. This also applies to a case where one of directions defined in a prescribed structure is set as the passing direction of a passing point when generating a passing point for passing through the inside of the prescribed component in a virtual space. When the position of a passing point is separated from the designated composure, an actually wired linear structure can be more avoided from contacting its component.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1 is a functional configuration of a cable route generation system mounting a design support system according to this preferred embodiment;

FIG. 4 passing direction defined in the passing point except the passing point of a starting point, the passing point of an ending point and a passing point which a cable should pass inside the model;

DESCRIPTION OF EMBODIMENTS

Preferred embodiment of the present invention will be explained with reference to accompanying drawings.

Figure 7A:
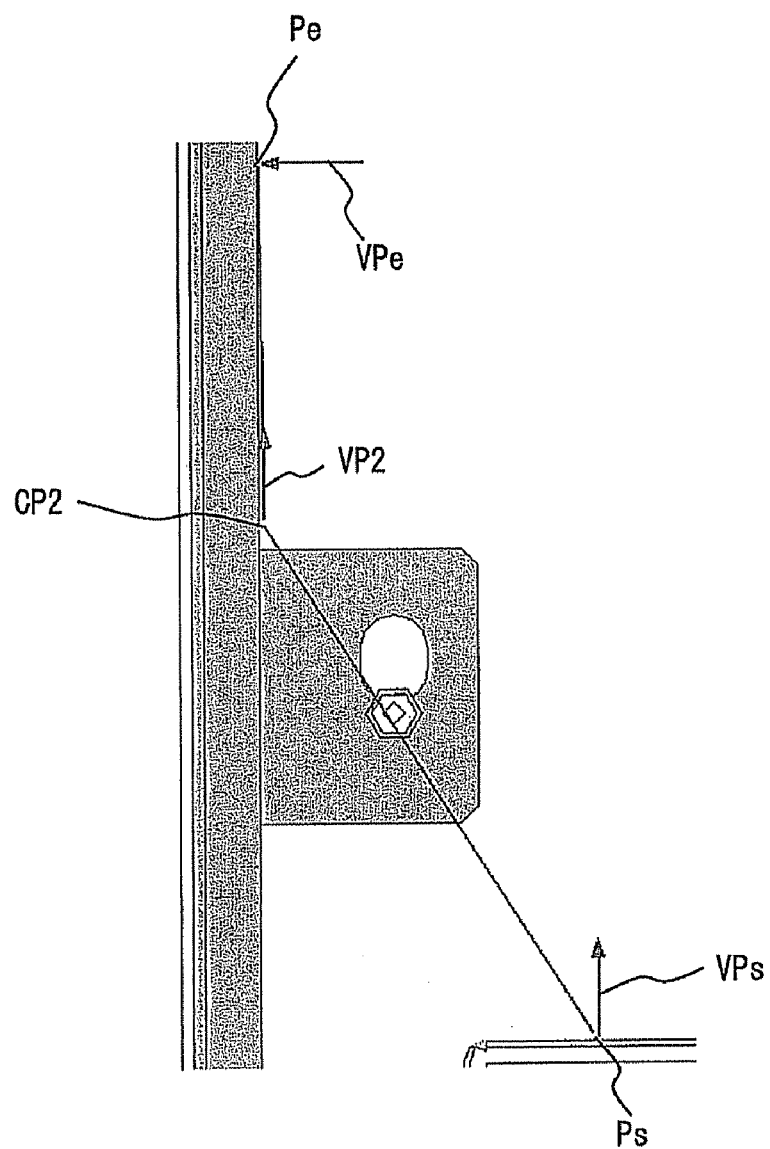
FIG. 7A is a display example of an actually defined passing point (front view)
Figure 7B:
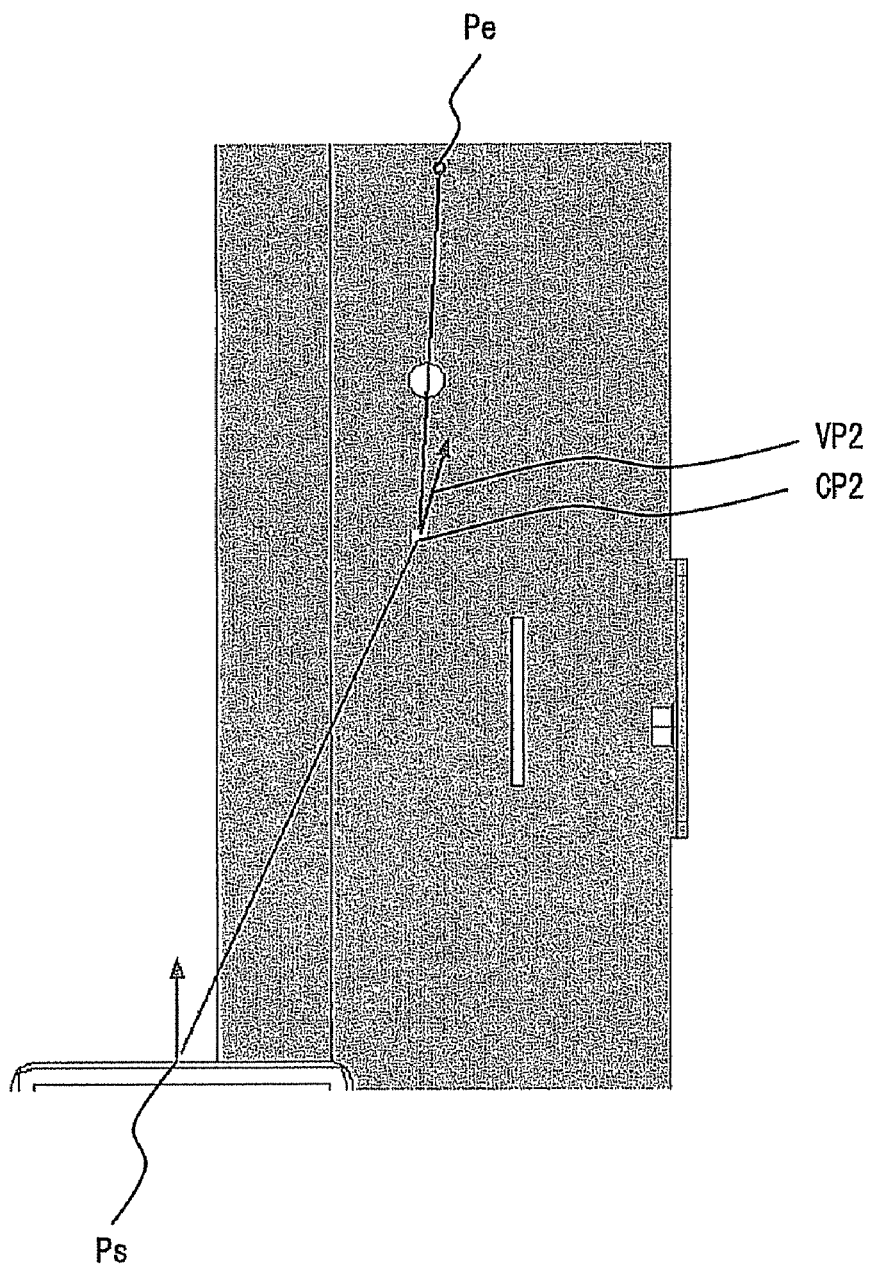
FIG. 7B is a display example of an actually defined passing point (side view)
Figure 7C:
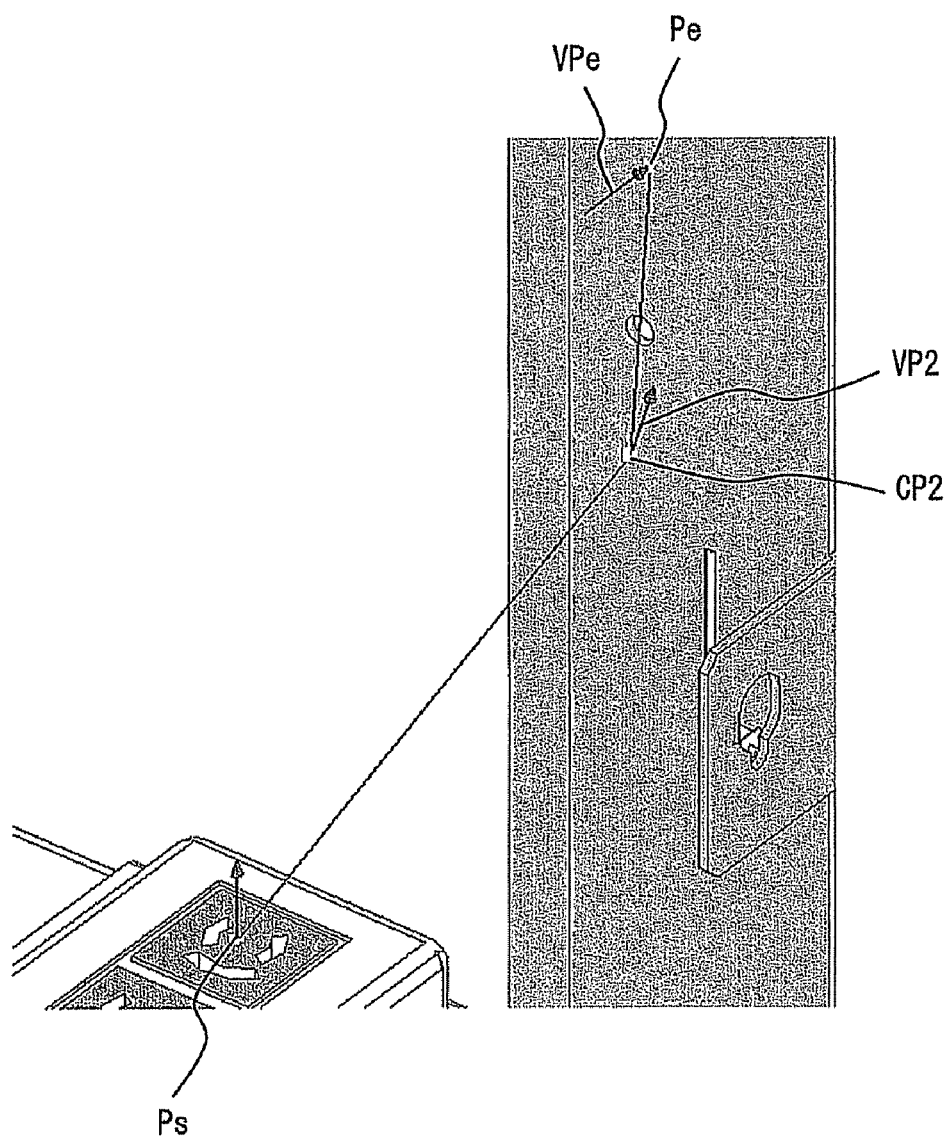
FIG. 7C is a display example of an actually defined passing point (oblique view)

FIG. 1 is a functional configuration of a cable route generation system (hereinafter called "generation system") mounting a design support system according to this preferred embodiment. The generation system 2 is used to design the route of a cable as illustrated in FIGS. 7A through 7C, as a deformable linear structure and a design support system according to this preferred embodiment is realized in the generation system 2.

An input device 1 operated by a user and an output device 3 are connected to the generation system 2. The input device 1 includes, for example, a pointing device, such as a mouse or the like and a keyboard. The output device 3 is, for example, a display device, such as an LCD display device or the like. Thus, the generation system 2 edits a passing point according to an operation for a route design, on the input device 1 by a user and displays the edition result or a cable whose route is designed, on the output device 3.

The generation system 2 includes a cable management unit 21, a three-dimensional model management unit 22, a passing point management unit 23, a display unit 24 and a route generation unit 25.

The cable management unit 21 is used to manage the route design for each cable. The three-dimensional model management unit 22 is used to manage the design data (model data) of each component disposed in a three-dimensionally designed device. Each model data is stored in a model data database (hereinafter called "DB") 22a and is managed by a verification model management unit 22b. The passing point management unit 23 is used to manage passing points for each cable under the control of the cable management unit 21. The passing point management unit 23 includes a passing point position individual management unit 23a, a passing direction management unit 23b and a passing direction reference coordinates management unit (hereafter called "coordinates management unit") 23c for passing point information management. The display unit 24 is used to display an image on the output device 3. An image for display generated passing points is generated by a passing point display unit 24a. The route generation unit 25 is used to generate the route of a cable whose route is designed.

Figure 10:
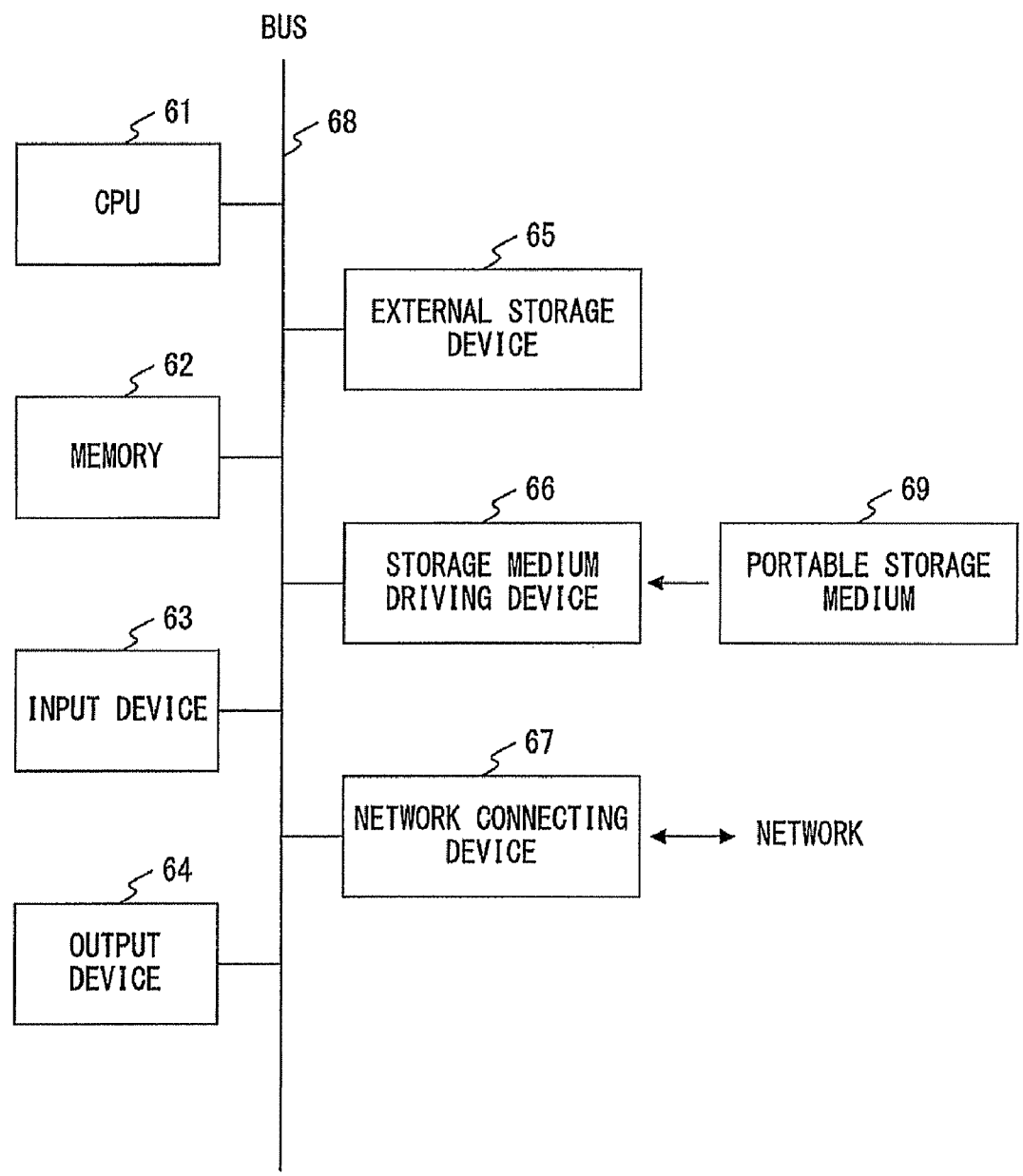
FIG. 10 is one example of the hardware configuration of a computer capable of realizing a cable route generating system mounting a design support system according to this preferred embodiment.

FIG. 10 is one example of the hardware configuration of a computer capable of realizing the above-described generation system 2. Prior to the detailed description of FIG. 1, the configuration of a computer capable of realizing the generation system 2 will be explained in detail. For the purpose of avoiding confusion, hereinafter it is assumed that the generation system 2 is realized by one computer whose configuration is illustrated in FIG. 10.

The computer illustrated in FIG. 10 includes a CPU 61, memory 62, an input device 63, an output device 64, an external storage device 65, a storage medium driving device 66 and a network connecting device 67, which are connected to each other by a bus 68. The configuration illustrated in FIG. 10 is only one example and is not restrictive of the preferred embodiment.

The CPU 61 controls the entire computer. The memory 62 is storage device, such as RAM or the like, for temporarily storing a program or data stored in the external storage device 65 (or a portable storage medium 69) at the time of program execution, data update and the like. The CPU 61 controls the entire computer by reading the program into the memory 62 and executing it.

The input device 63 is, for example, an interface connected to the input device 1, such as a keyboard, a mouse or the like, or a device including their combination. The input device 63 detects the operation of a user on the input device 1 and notifies the CPU 61 of the detection result.

The output device 64 is, for example, a display control device connected to the output device 3 illustrated in FIG. 1 or a device including it. The output device 64 outputs data transmitted under the control of the CPU 61 on the output device 3 illustrated in FIG. 1.

The network connecting device 67 is used to communicate with an external device via a network, such as an intra-network, the Internet or the like. The external storage device 65 is, for example, a hard disk device. The external storage device 65 is mainly used to store various types of data and programs.

The storage medium driving device 66 is used to access the portable storage medium 69, such as an optical disk, a magneto-optical disk or the like.

The result of a route design is stored in the memory 62 or the external storage device 95. Design data including the model data of a device in which a cable is disposed is stored in the external storage device 95 or the portable storage medium 69. In this example, it is assumed for convenience' sake that the design data is stored in the external storage device 95. In that case, the DB 22a is stored in the external storage device 95.

A design support system (generation system 2) according to this preferred embodiment can be realized by the CPU 61 executing a program (hereinafter called "design support software") mounting functions needed for it. The design support software can be recorded, for example, on the portable storage medium 69 and be distributed. Alternatively, it can be obtained by the network connecting device 67. In this example it is assumed that it is stored in the external storage device 95.

In the above-described assumption, the cable management unit 21 can be realized, for example, by the CPU 61, the memory 62, the input device 63, the external storage device 65 and the bus 68. The passing point management unit 23, the route generation unit 25 and the three-dimensional model management unit 22 can be realized, for example, by the CPU 61, the memory 62, the output device 64, the external storage device 65 and the bus 68. The display unit 24 can be realized, for example, by the CPU 61, the memory 62, the output device 64, the external storage device 65 and the bus 68.

In this preferred embodiment, when user instructs generating the passing point by the input device 1, the position and the passing direction are automatically set as passing point information, as follows. Thus, the route (the curved line) calculated from passing points is generated surely and adequately more. The detail will be explained with reference to FIGS. 2 through 8C.

In this preferred embodiment, as a positional reference being a reference for specifying the position of a passing point, reference coordinates based on the origin of a coordinate system in a virtual space, relative coordinates based on other passing point and a model reference based on a component (model) disposed in a virtual space are prepared as in the conventional design support system. A passing point is generated by responding to the designation of a place whose generation is desired. The positional reference is determined depending on a place whose position is designated in order to instruct the generation of a passing point.

Figure 2:
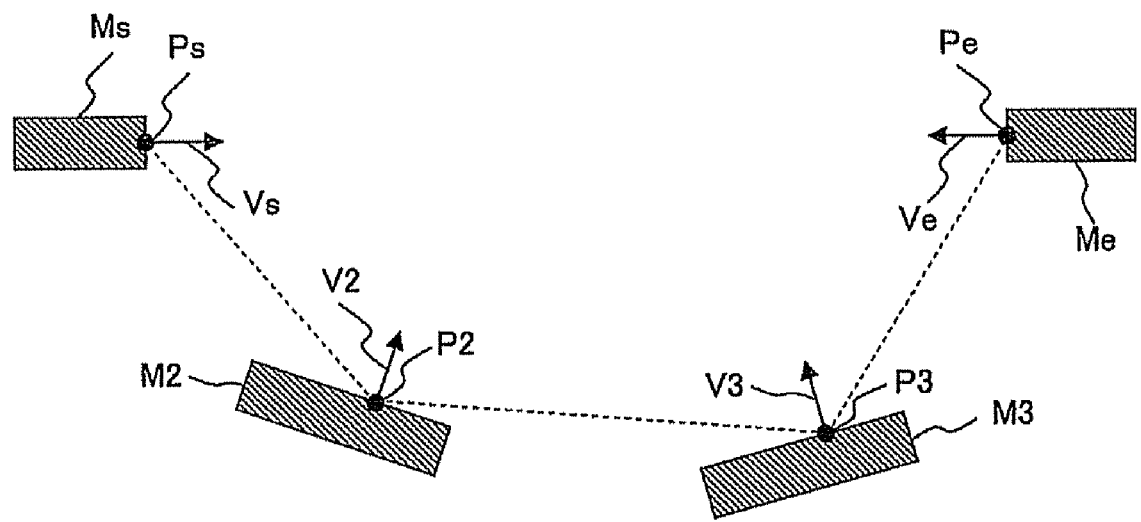
FIG. 2 is an example of passing points whose positions are designated by the route design of a cable.

FIG. 2 is an example of passing points whose positions are designated by the route design of a cable. In FIG. 2, any symbol string whose head is "P" indicates a place whose position is designated by a user in order to instruct the generation of a passing point and symbols following the "P" indicates a positional relationship between pick points (passing points generated by the position designation of it). Specifically, Ps, Pe, P2 and P3 indicate a pick point whose position is designated as a passing point corresponding to the starting point of a route, a pick point whose position is designated as a passing point corresponding to the ending point of a route, a pick point whose position is designated as a passing point through which a cable should pass following the passing point Ps and a pick point whose position is designated as a passing point through which a cable should pass following the passing point P2, respectively. Any symbol string whose head is "M" indicates a component (model) being the reference and symbols following the "M" indicates a correspondence relationship with a pick point (a passing point). Specifically, Ms, M2, M3 and Me indicate a model being the reference of the pick point Ps, a model being the reference of the pick point P2, a model being the reference of the pick point P3 and a model being the reference of the pick point Pe, respectively. Any symbol string whose head is "V" indicates the normal vector (arrow) of the plane of a component (model) being the reference, on which a pick point exists (hereinafter called "pick plane") and symbols following the "V" indicates a correspondence relationship with a pick point (a passing point). Specifically, Vs, V2, V3 and Ve indicate the normal vector of a pick plane on which the pick point Ps exists, the normal vector of a pick plane on which the pick point P2 exists, the normal vector of a pick plane on which the pick point P3 exists and the normal vector of a pick plane on which the pick point Pe exists, respectively.

In this preferred embodiment, the passing points of a model reference are classified into a passing point as a starting point, a passing point as an ending point, a passing point which a cable should pass inside the model and others, and the position of a passing point and its passing method are defined (set) by a different method for each classification. Thus, the position of a passing point does not always coincide with the position of a pick point. Therefore, a passing point whose position is different from the position of a pick point is indicated by a symbol string whose head is "CP". The same symbol as a pick point is used for a passing point whose position is the same as the position of a pick point. The passing direction is indicated by a symbol string whose head is "VP". Similarly, the correspondence relationship with a pick point is indicated by symbols following "CP" or "VP". Hereinafter, the following explanation will be made presuming that such a notion is used. When any pick point other than the pick points Ps and Pe whose positions are designated by the passing points of starting and ending points are targeted, "P" is used as the head symbol.

The positions of the passing points of starting and ending points are the same as those of the pick points Ps and Pe, respectively. Their passing directions VPs and VPe are the normal vector Vs and the vector the reversal of the normal vector Ve. This is because it is assumed that in the passing point Ps of a starting point, a cable is vertically attached to a hole provided in a connector or a component. Based on such an assumption, in the passing point Pe of an ending point, a vector the reversal of the normal vector Ve is defined as a passing direction.

Figure 3:
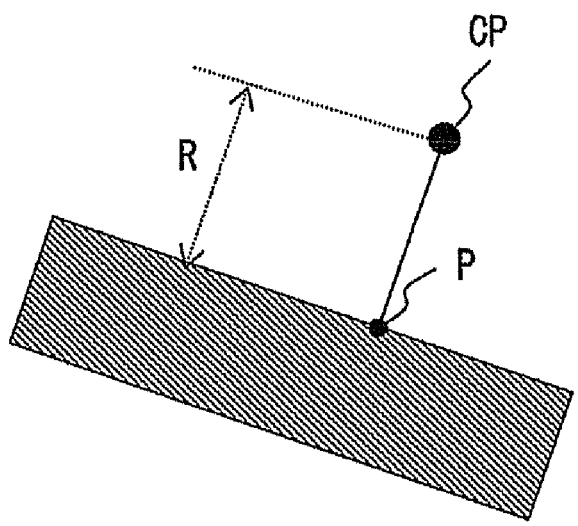
FIG. 3 explains position defined in the passing point except the passing point of a starting point, the passing point of an ending point and a passing point which a cable should pass inside the model.

FIG. 3 explains position defined in the passing point except the passing point of a starting point, the passing point of an ending point and a passing point which a cable should pass inside the model.

As illustrated in FIG. 3, a passing point CP other than the passing points of starting and ending points is automatically defined in a position away from a pick point P by a prescribed offset in a normal vector direction. In this preferred embodiment, the offset is assumed to be the minimum radius R of a cable. It is because a cable is avoided from contacting a model M that such an offset is got away from the model M (the pick plane of it). By avoiding such a contact, the cable can be prevented from receiving an unintentional influence due to the contact with the model M, or the influence can be more mitigated.

FIG. 4 explains passing direction defined in the passing point except the passing point of a starting point, the passing point of an ending point and a passing point which a cable should pass inside the model.

As illustrated in FIG. 4, in this preferred embodiment, when setting the passing direction VPn of a passing point CPn, firstly, vectors CV1 and CV2 are generated between a pick point Pn and pick points Pn−1 and Pn+1 before and after it, respectively, and a vector CV3 being the sum is calculated. Then, a vector (vector parallel to a pick plane) in which the sum vector CV3 is projected on the pick plane is calculated and the vector is specified as a passing direction VPn.

FIGS. 5A through D explain a difference among cable routes determined by different passing direction defined in a passing point. Next, the reason why the above-described passing direction is automatically defined will be explained in detail with reference to FIGS. 5A through D.

Figure 5A:
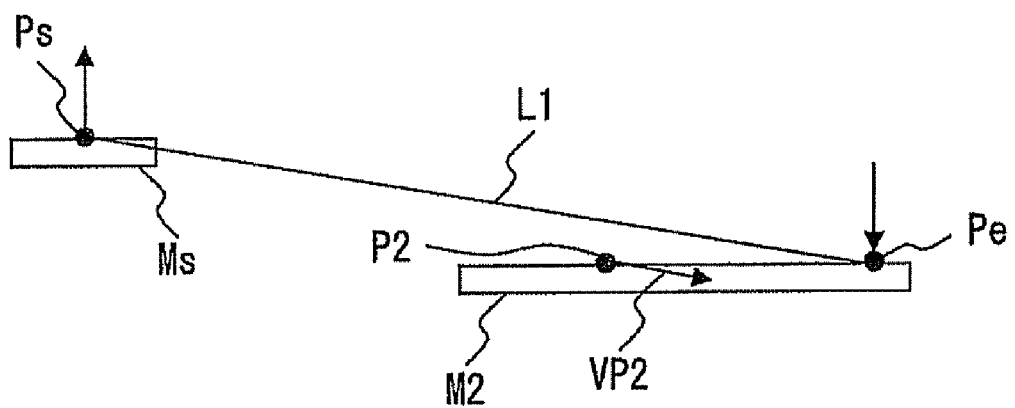
FIG. 5A illustrates the definition method of a conventional passing direction.

FIG. 5A illustrates the conventional definition method of a passing direction. As illustrated in FIG. 5A, conventionally, a line L1 connecting previous and subsequent pick points (passing points) Ps and Pe is calculated and a direction parallel to the line L1 is defined as the passing direction VP2 of the passing point P2.

Figure 5B:
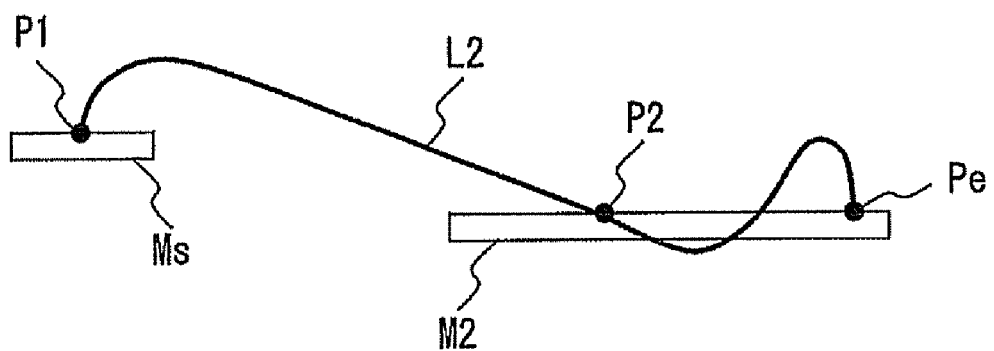
FIG. 5B illustrates the route of a cable, determined when a passing direction is defined as illustrated in FIG. 5A.

FIG. 5B illustrates the route of a cable, determined when the passing direction VP2 is defined as illustrated in FIG. 5A.

As described above, the route of a cable is determined by calculating a parametric curve, such as a Bezier curve. Therefore, as illustrated in FIG. 5A, when the passing direction VP2 goes toward the inside of the model M2, a determined route L2 is inappropriate since it passes through the inside of the model M2.

Figure 5C:
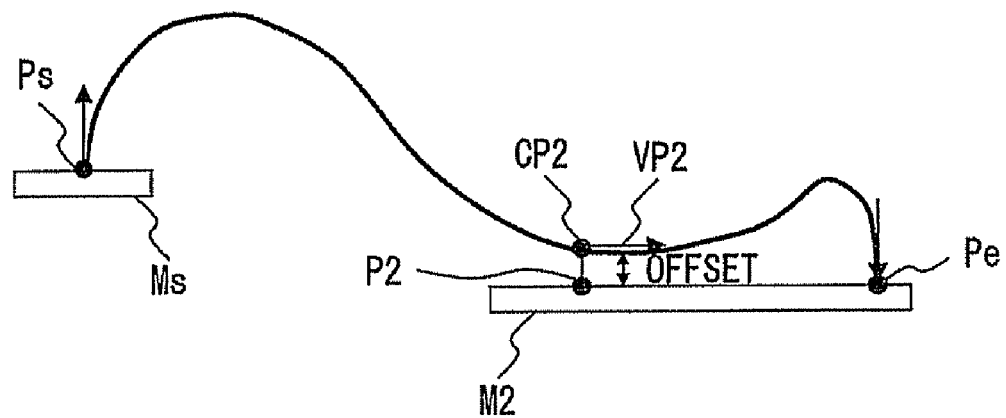
FIG. 5C illustrates the route of a cable, determined when a passing direction is defined by this preferred embodiment.

FIG. 5C illustrates the route of a cable, determined when a passing direction is defined by this preferred embodiment.

Figure 5D:
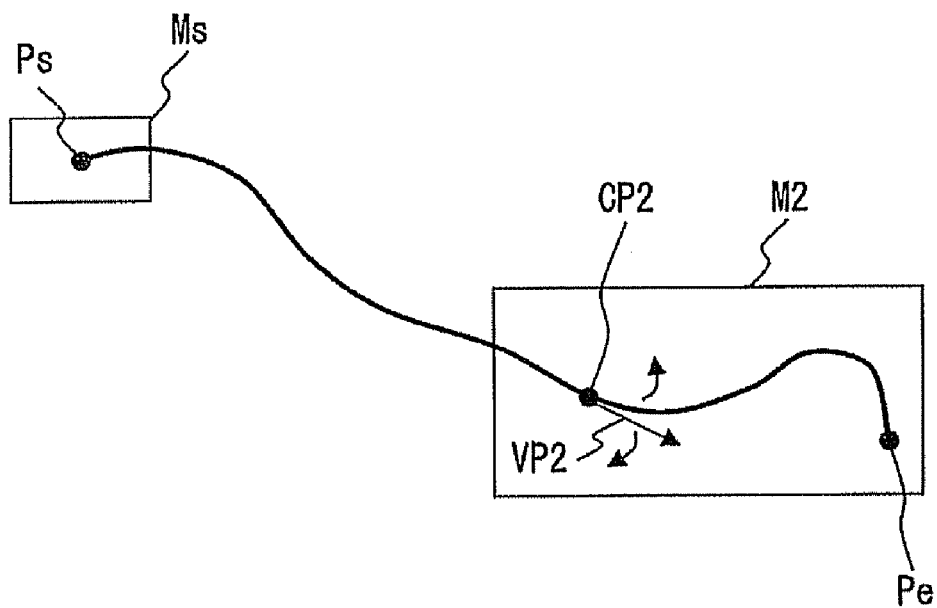
FIG. 5D explains the range of a passing direction definable by this preferred embodiment.

In this preferred embodiment, in the passing point CP of a model reference, other than the passing points of starting and ending points, a passing direction VP is parallel to a pick plane. Therefore, as illustrated in FIG. 5C, a determined route does not pass through the inside of the model M2. Thus, a realistic route can be surely determined. Such a route determination can be also surely realized by rotating the passing direction VP2 using the normal vector of a pick plane as the axes, as illustrated in FIG. 5D. Therefore, such a passing direction VP can be also calculated by another method as long as it is parallel to a pick plane. More specifically, the vectors CV1 and CV2 illustrated in FIG. 4 can be also generated using passing points set by the pick points of previous and subsequent passing points, respectively, instead of the pick points themselves.

A route is generated between every two passing points. Thus, a generated route can be obtained by connecting the passing points. The end of the route, that is, a tangent line in a passing point is parallel to the passing direction of the passing point. Therefore, the passing point is also called a tangent vector.

Figure 6:
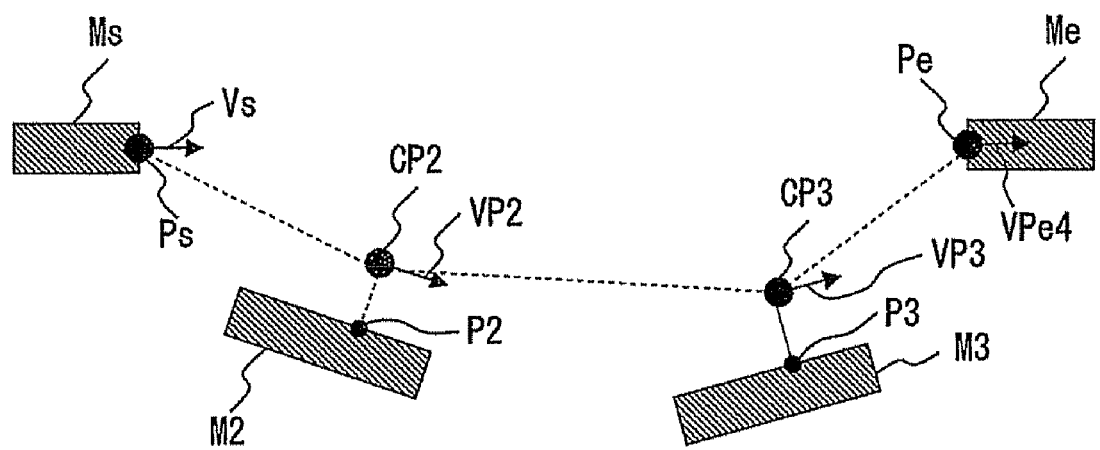
FIG. 6 illustrates passing points actually defined when the positions of the passing points are designated as illustrated in FIG. 2.

FIG. 6 illustrates passing points actually defined when the positions of the passing points are designated as illustrated in FIG. 2. As illustrated in FIG. 2, in order to define a position and a passing direction for each classification of a passing point, as illustrated in FIG. 6, the positions of the passing points Ps and Pe of starting and ending points are the same as the positions of pick points, and the positions of other passing points CP2 and CP3 are different from those of pick points P2 and P3. The passing direction VPs of the passing point Ps, the passing direction VPe of the passing point Pe and the passing points VP2 and VP3 of other passing points CP2 and CP3 are parallel to the normal vector of a pick plane, a vector the reversal of the normal vector of a pick plane and a pick plane, respectively. FIGS. 7A through C illustrate display examples of actually defined passing points. FIGS. 7A, 7B and 7C are front, side and oblique views, respectively.

As described above, sometimes, of models (components), one for a cable exists. A component for clumping a cable in order to fix (hereinafter called "clump component") is its representative. In this preferred embodiment, when such a clump component is designated as the reference (reference destination), that is, a passing point for passing a cable through the inside of a model is designated, a peculiar direction is defined as a passing direction by the clump component.

Figure 8:
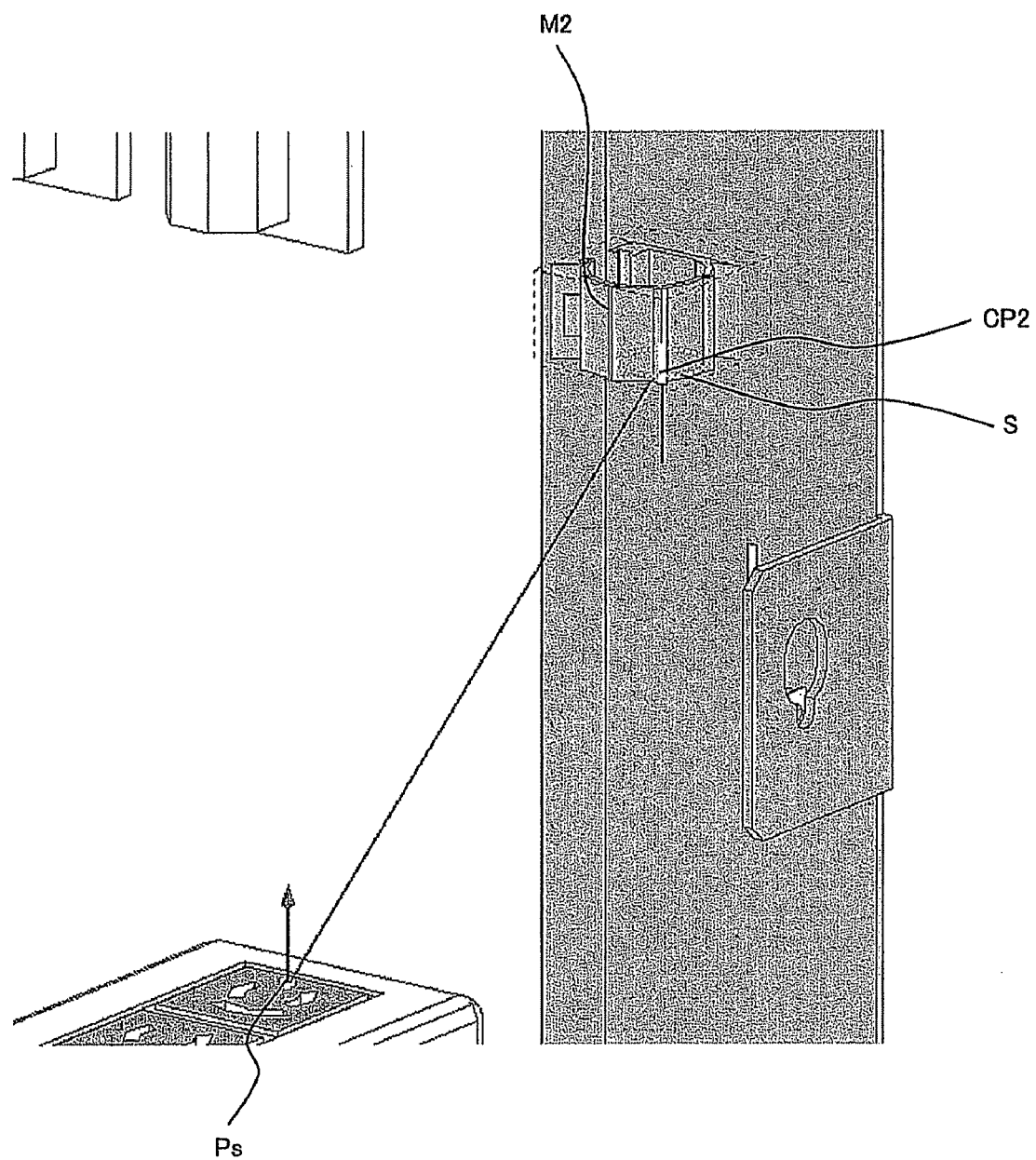
FIG. 8 explains a passing direction defined when a clump component is designated as the reference.

FIG. 8 explains a passing direction defined when a clump component is designated as the reference. M2 and S are a clump component and a circle defined in the clump component M2, respectively. As the circle S, one perpendicular to a cable-passable direction is defined.

In this preferred embodiment, when the circle S defined in the clump component M is designated as the position of a pick point, the center axis direction of the circle S, that is, a direction is defined as a passing direction VP. The route design assumes that passing points are sequentially generated from the passing point Ps of a starting point toward the passing point Pe. Since a cable passes through the clump component M, two circles S are defined. There are two cable-passable directions. In the example illustrated in FIG. 8, in addition to a direction where a cable passes through the clump component M from bottom toward top, a user can select a direction where a cable passes through the clump component M from top toward bottom. Therefore, a passing direction VP is determined by the position designation of a subsequent pick point CP after designating the position of a circle S. The passing point CP is positioned at the center of the circle S whose position is designated as a pick point P. Thus, it is regarded that a model in which the circle S is defined is designated as the reference.

In a passing point CP through which a clump component M passes, a direction where a cable can pass through the clump component M is automatically defined as a passing direction VP. Therefore, a user can generate an appropriate route without defining a passing direction VP by itself.

As a component whose passing direction is limited to one axes direction, there is an interface component, such as a connector or the like, besides the clump component M illustrated in FIG. 8. A passing direction is limited to one axes direction by designating a circle S defined in such a component as a pick point. Therefore, the designation of a circle S as a pick point is also called "to designate a circle center" or the like hereinafter. The simple designation of a model being the reference, that is, the limitation of a passing direction to a direction parallel to a pick plane is also called "to designate on a plane" or the like hereinafter.

Back to FIG. 1, the operations of respective unit 21 through 25 for realizing the above-described support of a route design will be explained in detail.

The cable management unit 21 analyzes an operation applied to the input device 1, recognizes the instruction contents of a user and performs a process according to the recognition result. Thus, a route design can be realized, and the data of a passing point generated by editing is generated and stored by the passing point management unit 23 as a result of the design.

The passing point management unit 23 generates a table for passing point information management (hereinafter called "passing point position table") for each cable being the target of a route design by the edition work of a passing point by a user and updates it, if necessary. The passing point position table stores, for example, passing point information such as the position, passing direction, positional reference and the like, for each passing point. It is updated, for example, under the control of the cable management unit 21.

The passing point position individual management unit 23a stores/updates the respective pieces of data of relative positional reference, such as position coordinates, reference position coordinates, a reference model name, a reference model relative position and the like. The passing direction management unit 23b determines a passing direction. The passing direction reference coordinates management unit 23c stores/updates data for each axis indicating a determined passing direction. Any of them is performed according to the instruction contents of a user, recognized by the cable management unit 21. Thus, route design is supported through the edition of a passing point.

The route generation unit 25 generates a cable route designed by a user by referring to the passing point position table while taking the hardness of a cable, specified by its cross-sectional shape and transmits the generation result to the display unit 24. Thus, it displays the cable along the route on the output device 3 as the design result. The route is generated by a publicly known technology.

Figure 9:
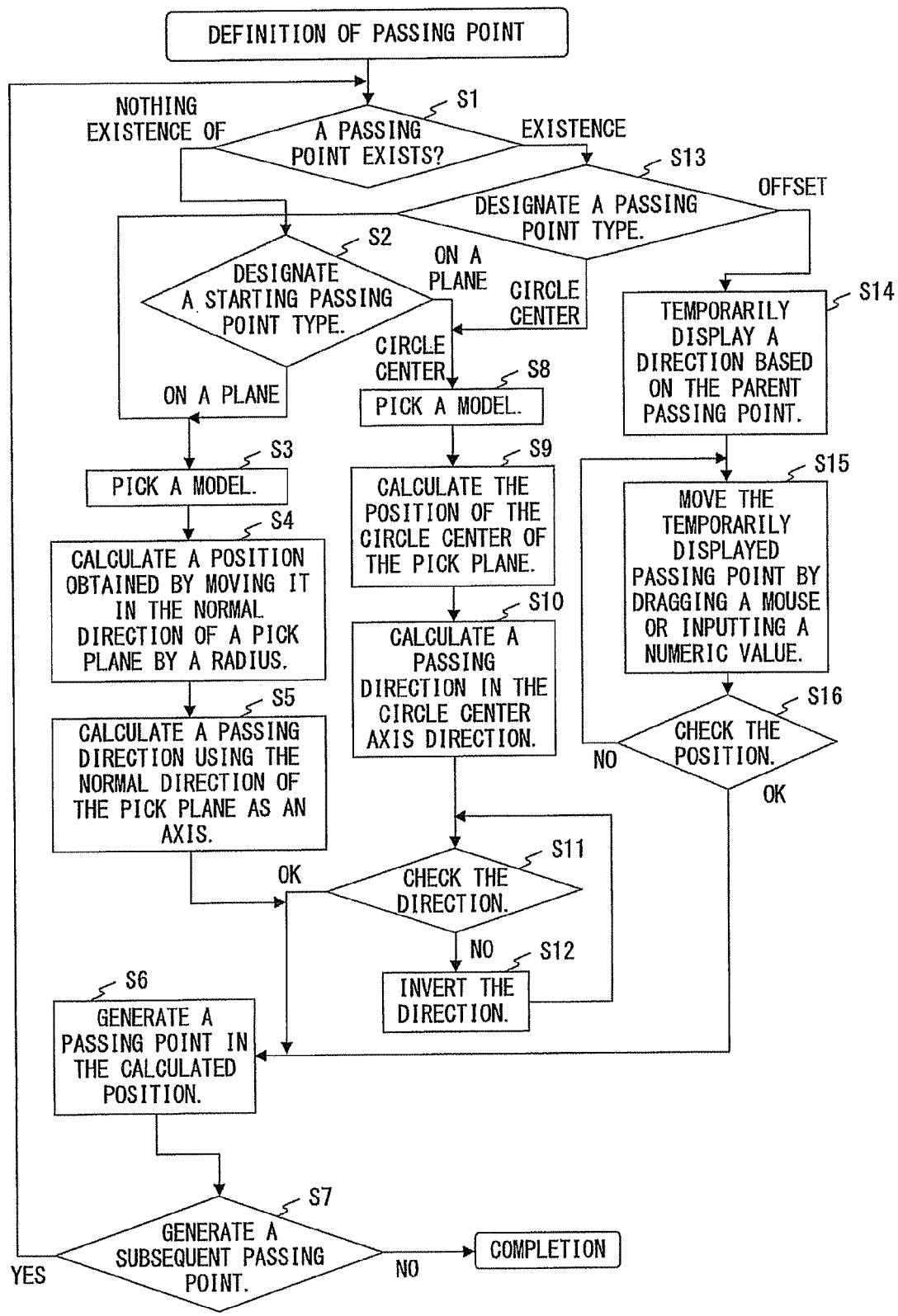
FIG. 9 is a flowchart of a passing point generating process.

FIG. 9 is a flowchart of the passing point generating process. The passing point generating process is performed in order to correspond to the position designation of a pick point by a user and is realized by the CPU 61 illustrated in FIG. 10 reading design support software stored in the external storage device 65 into the memory 62 and executing it. Next, a process for realizing the operation of the above-described generation system 2 will be explained in detail with reference to FIG. 10.

Position designation as the generation instruction of a passing point, that is, the designation of a pick point can be realized by clicking a point in a virtual space displayed on the output device 3. Alternatively, it can be realized by clicking a desired point after designating the type of a passing point. For the purpose of avoiding confusion, in the passing point generating process illustrated in FIG. 9 a process performed when designating the type of a passing point (the latter case) is extracted and its flow is illustrated. The flow is illustrated for each type.

Firstly, in step S1, after a user designates the type of a passing point, it is determined whether there is a passing point. If an already generated passing point exists, it is determined so and the process moves to step S13. Otherwise, that is, if no passing point exists, it is determined so and the process moves to step S2.

In step S2 a type designated in the passing point of a starting point (described a "starting passing point" in FIG. 9) is determined. If in the designation the user selects circle center, it is determined so and the process moves to step S8. If the user selects "on a plane", it is determined so and the process moves to step S3. Thus, in this preferred embodiment, only model reference can be selected in the type designation in the case where the generation of the passing point of a starting point is instructed.

In step S3 it is awaited for the user to designate a pick point. After the designation, the process moves to step S4 and the position of the designated pick point is calculated. Then, in step S5 the normal direction of the pick plane in the calculated position is calculated as a passing direction VPs. Subsequent a passing point Ps whose passing information is the calculated position and passing direction is generated in step S6, the process moves to step S7.

In step S7 it is determined whether a subsequent passing point is generated. If the user selects the generation of a subsequent passing point, the determination is yes and the process returns to step S1. If the user instructs the termination of the passing point generation, the determination is no and the passing point generating process is terminated here.

An inquiry about whether the design result should be stored is issued as requested by the no determination in step S7, that is, if it is not stored. Thus, a design result that is not stored is processed according to the inquiry result. The passing point generated last is regarded as the passing point Pe of an ending point, and its position and passing direction Pe are automatically set. Therefore, if a passing point is further added, the passing point regarded as an ending point is handled as a type designated by the user. Such a type modification is performed by the yes determination in step S7.

In step S8 it is awaited for the user to designate a pick point (a circle S in this case). If this is designated, the process moves to step S9 and the center position of the designated circle S is calculated. Then, in step S10 a passing direction is calculated as the center axis direction (one of two directions) of the circle S. After the calculation, the process moves to step S11 and the passing direction calculated in step S10 is checked. When it is determined that the calculated passing direction is inappropriate (NG) as the result of the check, the process moves to step S12, the passing direction is reversed, and performing the check of step S11 again. When it is determined that the calculated passing direction is appropriate (OK) as the result of the check, the process moves to step S6.

The check in step S11 is not performed in the passing point of a starting point. This is because in the passing point of a starting point, a passing direction is determined to be the normal direction of a pick point (FIG. 6). Therefore, in the case of the passing point of a starting point, actually the process moves to step S6 without the check in step S11.

In step S13 a type designated in a passing point is determined. If in this designation the user has selected a circle center, it is determined so and the process moves to step S8. If the user has selected "on a plane", it is determined so and the process moves to step S3. If in the designation the user has selected off-set, that is, reference coordinates or relative coordinates has selected by the user as the positional reference, it is determined so and the process moves to step S14.

When the process moves from step S13 to step S3, in steps S3 through S5, the following process is performed.

Firstly, in step S3 it is awaited for a user to designate a pick point. After the designation, the process moves to step S4 and a position obtained when the designated pick point is moved in the normal direction of a pick plane by a radius R is calculated. Then, in step S5 a passing direction is calculated using the normal direction of the pick plane as an axis. It is calculated by calculating vectors CV1 and CV2 on the basis of the respective pick positions of the parent passing point (a passing point positioned immediately before it) and a child passing point (a passing point positioned immediately after it), calculating a vector CV3 being the sum of them and calculating a vector obtained by projecting the sum vector CV3 on the pick plane.

The calculating the passing direction in step S5 is calculated after designating a subsequent pick point. However, in this example, such time sequence is ignored in order to clarify a process performed at the generation time of a passing point.

Thus, the contents of the process performed in steps S3 through S5 vary depending on from which it is moved step S2 or S13. This is because when it is moved from step S2, it is regarded that the pick point has been designated for the passing point of a starting point. Therefore, the user can design a route assuming that an interface component is disposed in the pick point.

In step S14 a passing point is temporarily displayed in a position obtained by off-setting the parent passing point by the initial value in a virtual space and a line connecting the temporarily displayed passing point and the parent passing point is displayed. Then, in step S15 the temporarily displayed passing point is moved by dragging a mouse or inputting a numeric value. The movement is repeated as requested until in step S16 the user okays. The process is moved to step S6 by the user okaying, that is, instructing the completion of the positional movement.

Although in this preferred embodiment, a passing point other than starting and ending points is got away from a model (pick point) being the reference by a prescribed offset (a radius R), it can also do without being got away from the model (pick point). Or the offset can be set a user voluntarily. Although in the passing point of a clump component, its passing direction is determined by the position designation of a subsequent passing point, its passing direction can be also determined by a circle S designated in the clump component. This is because a designated circle S can be regarded as a side on which a cable enters or exits.

In this preferred embodiment, it is assumed that a linear structure whose route is designed is a cable and a target whose route design is supported is a device handled as one product (FIG. 7A-FIG. 8). However, the linear structure can be also an electric wire, a cable, a wire or the like as long as it is deformable (for example, flexible). Alternatively, it can be a linear structure for flowing a fluid, such as the air, liquid or the like or for passing another linear structure through the inside. If three-dimensional data exists, a route can be designed taking deformation into consideration in a virtual space. Therefore, as long as a slim deformable component that can be handled in a virtual space, it can be a target whose route design is supported.

Figure 11:
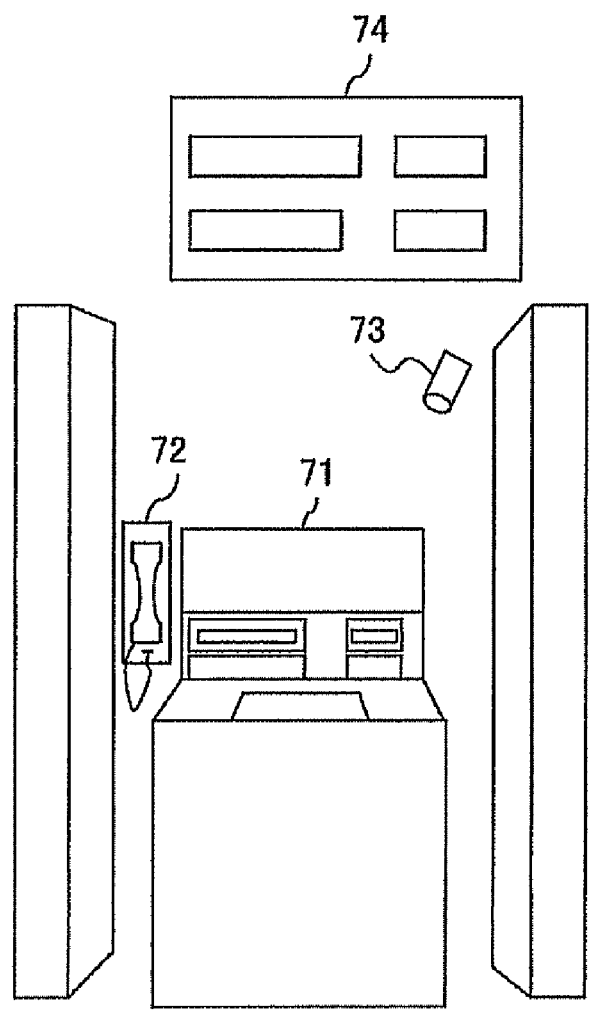
FIG. 11 is a front view of devices installed in each automatic machine.
Figure 12:
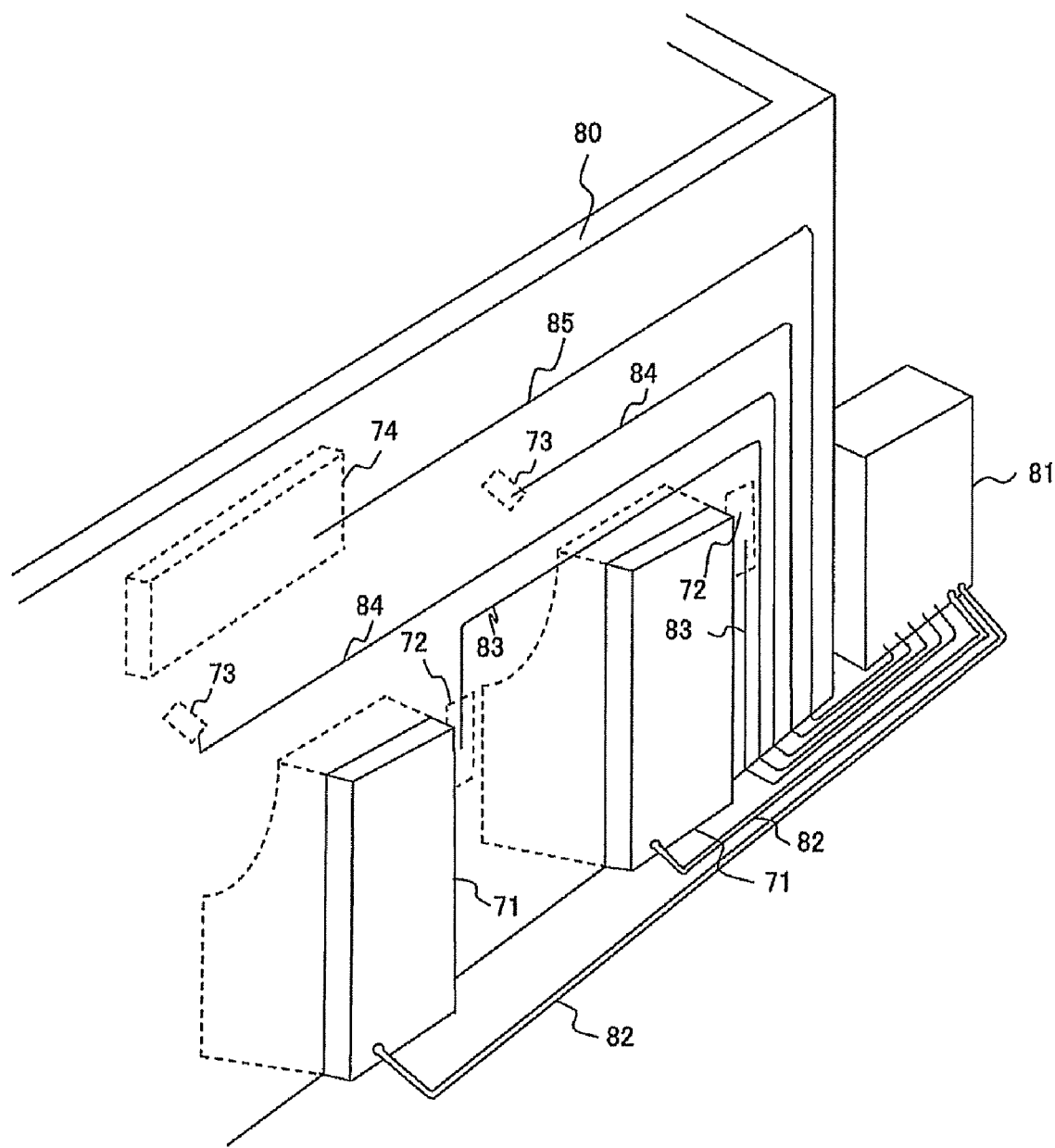
FIG. 12 is an example of wiring conducted on the rear side of the automatic machine.

A target whose route design is supported can also be another device requiring a linear structure, such as a vehicle, a motorcycle, an automatic machine such as an ATM, etc., another electric device or the like. Alternatively, it can be a plurality of devices installed in respective different places as follow (for example, each device separately handled as one final product). They will be explained in detail with reference to FIGS. 11 and 12. FIGS. 11 and 12 are examples of a case where a plurality of devices is targeted. More particularly, it is a case where a plurality of automatic machines, such as ATM or the like is installed in a space provided in a building used by a financial institute, such as a bank or the like.

FIG. 11 is a front view of devices installed in each automatic machine 712. As illustrated in FIG. 11, one automatic machine 71 is provided with a telephone set 72 for communications with a clerk and a camera 73 for crime prevention. A reference numeral 74 is a display device for transmitting information to a client to use the automatic machine 71.

FIG. 12 is an example of wiring conducted on the rear side of the automatic machine 71. As illustrated in FIG. 12, each automatic machine 71 is installed in a state where its rear side protrudes a little from a wall 80. Each telephone set 72, each camera 73 and the display device 74 are attached to the wall 80 and installed. A reference numeral 81 is a server installed in order to control/manage them. The server 81 is connected to another server, which is not illustrated in FIG. 12 or a host computer via a LAN (cable) or the like.

Respective automatic machines 71 are connected to each other via the server 81 and the cable 82. Each telephone set 72, each camera 73 and the display device 74 are connected to the server 81 via respective cables 83, 84 and 85. Most of the cables 82 attached to respective automatic machine 71 are laid on the floor and the other cables 83 through 85 are pasted and installed on the wall 80 up to the middle.

As illustrated in FIG. 12, the route design of connecting a plurality of devices 71 through 74 and 81 by the cables 82 through 85 can be performed in a virtual space by preparing the design data of the respective devices 71 through 74 and 81, the shape data of the wall 80 and the floor (three-dimensional data), and handling the wall 80 or the server 81 through the cable as a structure having starting or ending points. Therefore, the plurality of devices (and places in which they are installed) can be made a target to which the route design of a linear structure can be applied.

When a plurality of devices is targeted, respective devices and structures (a wall and a floor in this example) are handled as structures corresponding to components in this preferred embodiment. Thus, the type and range of a component whose passing direction is automatically set vary depending on a target. Therefore, the structure is not limited to a component. It is OK if a plurality of targeted devices is not installed on the same floor. In other words, a plurality of devices (and structures in which they are installed) disposed on different floors can be also targeted.

As described above, a system to which the present invention is applied generates (defines) and manages passing point information including the passing direction of the passing point, on the basis of a designated component as the reference when generating a passing point of type, based on a component such as part, device or the like, in a virtual space as the passing point through which the linear structure should pass in the virtual space. By taking the component into consideration, an appropriate passing direction can be more surely set. Therefore, the appropriate route of the linear structure can be more surely determined. Since the passing direction can be automatically set, the operability of a user can be improved and a route can be more easily designed. This also applies to a case where one of directions defined in a prescribed component is set as the passing direction of a passing point when generating a passing point for passing through the inside of the prescribed component in the virtual space. When the position of a passing point is separated from the designated component, an actually wired linear structure can be more avoided from contacting its component.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment of the present invention have been described in detail, it should be understood that the various changes, substitutions, and alterations could be made hereto without departing from the spirit and scope of the invention.

What is claimed is:

1. A design support system for supporting a route design for attaching a deformable linear structure to a target, comprising:
    an edition unit capable of for generating a passing point through which the linear structure should pass in a virtual space, according to an instruction of a user via an input device;
    a passing point management unit capable of for generating and managing passing point information including a passing direction of the passing point, on the basis of a designated component as a reference when generating a passing point of a type based on a component in the virtual space by the edition unit; and
    a route generation unit capable of for generating a route through which the linear structure should pass in the virtual space, using passing point information managed by the passing point management unit, wherein
    the router generation unit determines a normal vector of a plane of the designated component as the passing direction when the passing point of the type is a starting point, and generates a route through which the linear structure should pass in the virtual space and determining a direction of a reversal of the normal vector of the plane of the designated component as the passing direction when the passing point of the type is an ending point.

2. The design support system according to claim 1, wherein the passing point management unit sets one of a direction parallel to a plane of the designated component and a direction perpendicular to the plane of the designated component as the passing direction.

3. The design support system according to claim 2, wherein when the passing point is one of starting and ending points of the route, the passing point management unit sets a direction perpendicular to the plane of the designated component as the passing direction.

4. The design support system according to claim 3, wherein the passing point management unit sets a direction toward outside of the designated component and a direction toward inside of the designated component as the direction perpendicular to the plane in the starting and ending points, respectively.

5. The design support system according to claim 2, wherein when the passing point of the type corresponds to neither starting point nor ending point of the route, the passing point management unit sets a direction parallel to the plane of the designated comonent as the passing direction.

6. The design support system according to claim 5, wherein the passing point management unit generates two vectors taking the passing point of the type and two passing points positioned before and after the passing point of the type, calculates a sum vector being a sum of the two vectors and sets the direction parallel to the plane obtained by projecting the sum vector on the plane of the designated component as the passing direction.

7. The design support system according to claim 1, wherein when the edition unit generates the passing point which passes the linear structure through inside of a prescribed component as the passing point of the type based on the component in the virtual space, the passing point management unit sets and manages one of directions defined in the prescribed component as a passing direction of the passing point.

8. The design support system according to claim 1, wherein the passing point information includes a position of the passing point of the type, and
    when the passing point of the type corresponds to neither starting point nor ending point of the route, the passing point management unit sets a position away from a designated component as the reference by a prescribed distance as a position of the passing point of the type.

9. A design support system for supporting a route design for attaching a deformable linear structure to a target, comprising:
    an edition unit capable of for generating a passing point through which the linear structure should pass in a virtual space, according to an instruction of a user via an input device;
    a passing point management unit capable of for setting and managing one of directions defined in a prescribed component as a passing direction of the passing point when generating a passing point for passing the linear structure through inside of the prescribed component in the virtual space; and
    a route generation unit capable of for generating a route through which the linear structure in the virtual space, using a passing direction managed by the passing point management unit, wherein
    the route generation unit determines a normal vector of a plane of the prescribed component as the passing direction when the passing point is a starting point, and generates a route through which the linear structure in the virtual space and determining a direction of a reversal of the normal vector of the plane of the prescribed component as the passing direction when the passing point is an ending point.

10. A design support method for supporting a route design for attaching a deformable linear structure to a target by a computer, comprising:
    generating a passing point through which the linear structure should pass in a virtual space, according to an instruction of a user via an input device;
    automatically generating and managing passing point information including a passing direction of the passing point, on the basis of a designated component as a reference when generating a passing point of a type based on a component in the virtual space by the edition process; and
    automatically generating the passing point information by determining a normal vector of a plane of the designated component as the passing direction when the passing point is a starting point, and generating a route through which the linear structure should pass in the virtual space and determining a direction of a reversal of the normal vector of the plane of the designated component as the passing direction when the passing point of the type is an ending point.

11. A design support method for supporting a route design for attaching a deformable linear structure to a target by a computer, comprising:
    generating a passing point through which the linear structure should pass in a virtual space, according to an instruction of a user via an input device;
    setting and managing one of directions defined in a prescribed component as a passing direction of the passing point when generating the passing point for passing the linear structure through inside of the prescribed component in the virtual space; and
    setting a normal vector of a plane of the prescribed component as the passing direction when the passing point is a starting point and setting a direction of a reversal of the normal vector of the plane of the prescribed component as the passing direction when the passing point is an ending point.

12. A design support method for supporting a route design for attaching a deformable linear structure to a target by a computer, comprising:
    generating a passing point through which the linear structure should pass in a virtual space, according to an instruction of a user via an input device;
    classifying type of passing point, based on a component into a starting point of a route, an ending point of the route and other passing point and setting and managing a different passing direction for each of the classification when generating the type of the passing point in the virtual space; and
    setting a normal vector of a plane of the component as the passing direction when the passing point is the starting point and setting a direction of a reversal of the normal vector of the plane of the component as the passing direction when the passing point is the ending point.

13. The design support method according to claim 12, wherein
    the type of passing point to be classified further includes a passing point for passing the linear structure through inside of a prescribed component in the virtual space.

14. A computer-accessible storage medium storing program used to configure a design support system for supporting a route design for attaching a deformable linear structure to a target, comprising:
    generating a passing point through which the linear structure should pass in a virtual space, according to an instruction of a user via an input device;
    automatically generating and managing passing point information including a passing direction of the passing point, on the basis of a designated component as a reference when generating a passing point of a type based on a component in the virtual space by the edition function; and
    generating a route through which the linear structure should pass in the virtual space, using passing point information managed by the passing point management function, wherein
    the routing generation function determining a normal vector of a plane of the designated component as the passing direction when the passing point of the type is a starting point and generating a route through which the linear structure should pass in the virtual space and determining a direction of a reversal of the normal vector of the plane of the designated component as the passing direction when the passing point is an ending point.

15. A computer-accessible storage medium storing program used to configure a design support system for supporting a route design for attaching a deformable linear structure to a target, comprising:
    an edition function capable of for generating a passing point through which the linear structure should pass in a virtual space, according to an instruction of a user via an input device;
    a passing point management function capable of for setting and managing one of directions defined in a prescribed component as a passing direction of the passing point when generating a passing point for passing the linear structure through inside of the prescribed component in the virtual space; and
    a route generation function capable of for generating a route through which the linear structure in the virtual space, using a passing direction managed by the passing point management function, wherein
    the routing generation function determines a normal vector of a plane of the prescribed component as the passing direction when the passing point is a starting point, and generates a route through which the linear structure in the virtual space and determining a direction of a reversal of the normal vector of the plane of the prescribed component as the passing direction when the passing point is an ending point.

* * * * *

UNITED STATES PATENT AND TRADEMARK OFFICE
CERTIFICATE OF CORRECTION

| | | |
|---|---|---|
| PATENT NO. | : 8,150,661 B2 | Page 1 of 1 |
| APPLICATION NO. | : 12/490988 | |
| DATED | : April 3, 2012 | |
| INVENTOR(S) | : Kouji Demizu et al. | |

It is certified that error appears in the above-identified patent and that said Letters Patent is hereby corrected as shown below:

Column 13, Line 33, In Claim 1, delete "router" and insert -- route --, therefor.

Column 13, Line 61, In Claim 5, delete "comonent" and insert -- component --, therefor.

Column 14, Line 19, In Claim 8, delete "the" and insert -- a --, therefor.

Column 14, Line 62, In Claim 10, delete "generating" and insert -- generates --, therefor.

Column 16, Line 11, In Claim 14, delete "routing" and insert -- route --, therefor.

Column 16, Line 37, In Claim 15, delete "routing" and insert -- route --, therefor.

Signed and Sealed this
Tenth Day of July, 2012

David J. Kappos
*Director of the United States Patent and Trademark Office*